US012595844B2

(12) United States Patent
Yamamoto et al.

(10) Patent No.: US 12,595,844 B2
(45) Date of Patent: Apr. 7, 2026

(54) SHIFT DEVICE

(71) Applicant: KABUSHIKI KAISHA TOKAI-RIKA-DENKI-SEISAKUSHO, Aichi (JP)

(72) Inventors: Makoto Yamamoto, Niwa-gun (JP); Yutaka Inamura, Niwa-gun (JP); Takuya Watanabe, Niwa-gun (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 18/865,539

(22) PCT Filed: Apr. 10, 2023

(86) PCT No.: PCT/JP2023/014639
§ 371 (c)(1),
(2) Date: Nov. 13, 2024

(87) PCT Pub. No.: WO2023/218832
PCT Pub. Date: Nov. 16, 2023

(65) Prior Publication Data
US 2025/0314294 A1     Oct. 9, 2025

(30) Foreign Application Priority Data

May 13, 2022     (JP) ................................. 2022-079664

(51) Int. Cl.
*F16H 59/12*     (2006.01)

(52) U.S. Cl.
CPC .................................... *F16H 59/12* (2013.01)

(58) Field of Classification Search
CPC ............................. F16H 59/12; F16H 61/0204
See application file for complete search history.

(56) References Cited

U.S. PATENT DOCUMENTS

| | | | |
|---|---|---|---|
| 9,021,913 B2* | 5/2015 | Kamoshida | ............. F16H 61/18 74/473.3 |
| 2012/0041655 A1* | 2/2012 | Thooris | ............... G06F 3/04886 701/52 |
| 2020/0309253 A1 | 10/2020 | Fribus et al. | |

FOREIGN PATENT DOCUMENTS

DE     10 2014 009 355 A1     12/2015

OTHER PUBLICATIONS

International Search Report issued in PCT/JP2023/014639, mailed Jun. 20, 2023.

* cited by examiner

*Primary Examiner* — Jake Cook
(74) *Attorney, Agent, or Firm* — Studebaker Brackett PLLC

(57) ABSTRACT

In the shift device (10), in a case where a finger F of an occupant touches a PR position (20PR) between a P position (20P) and an R position (20R) in a panel (16) and the PR position (20PR) is determined to be selected, a transmission is changed to a P range with a higher priority to an R range.

6 Claims, 5 Drawing Sheets

SHIFT DEVICE

BACKGROUND

Technical Field

The present disclosure relates to a shift device with a shift position configured to be selectable.

Related Art

German Patent Application Publication No. 102014009355 discloses a input device with a shift range of an automatic transmission is changed as a result of functional recessed part is touched.

Here, in this shift device, the shift range of the automatic transmission is not determined when a connecting part between the functional recessed parts is touched.

SUMMARY

In consideration of the above circumstances, it is an object of the present disclosure to obtain a shift device capable of determining a shift range of a transmission when a mid-position between shift positions is selected.

A shift device of a first aspect of the present disclosure includes a plurality of shift positions configured to be selectable and a detection unit configured to detect selection of a shift position to change a shift range of a transmission of a vehicle, and configured to detect selection of a mid-position between the shift positions to determine the shift range of the transmission of the vehicle.

In the shift device of the first aspect of the present disclosure, a plurality of shift positions are made selectable. The detection unit detects the selection of a shift position, and the shift range of the transmission of the vehicle is changed.

Here, the detection unit detects selection of the mid-position between the shift positions, and the shift range of the transmission is determined. Therefore, when the mid-position between the shift positions is selected, the shift range of the transmission can be determined.

A shift device of a second aspect of the present disclosure is the shift device of the first aspect of the present disclosure, wherein the detection unit includes: a shift detector configured to detect the selection of the shift position; and a mid-position detector configured to detect the selection of the mid-position.

In the shift device of the second aspect of the present disclosure, the detection unit includes: a shift detector; and a mid-position detector, the shift detector detects the selection of the shift position, and the mid-position detector detects the selection of the mid-position. Therefore, by providing the mid-position detector independently from the shift detector, the selection of the mid-position can be favorably detected.

A shift device of a third aspect of the present disclosure is the shift device of the first aspect or the second aspect of the present disclosure, wherein the transmission is shifted to a shift range with a higher priority among shift ranges corresponding to shift positions on respective sides of the mid-position when the detection unit detects the selection of the mid-position.

In the shift device of the third aspect of the present disclosure, when the detection unit detects the selection of the mid-position, the transmission is shifted to a shift range with a higher priority among shift ranges corresponding to shift positions on respective sides of the mid-position. Therefore, the transmission can be changed to a shift range with a higher priority.

A shift device of a fourth aspect of the present disclosure is the shift device of the third aspect of the present disclosure, wherein a threshold for selecting the shift position corresponding to the shift range with the higher priority rather than a shift position corresponding to a shift range with a lower priority is decreased.

In the shift device of the fourth aspect of the present disclosure, a threshold for selecting the shift position corresponding to the shift range with the higher priority rather than a shift position corresponding to a shift range with a lower priority is decreased. Therefore, the transmission can be appropriately changed to a shift range with a higher priority.

A shift device of a fifth aspect of the present disclosure is the shift device of the third aspect or the fourth aspect of the present disclosure, wherein a priority for a shift range at which the vehicle is not driven is made higher than that for a shift range at which the vehicle is driven.

In the shift device of the fifth aspect of the present disclosure, a priority for a shift range at which the vehicle is not driven is made higher than that for a shift range at which the vehicle is driven. Therefore, when the detection unit detects the selection of the mid-position, the vehicle can be restricted from being driven.

A shift device of a sixth aspect of the present disclosure is the shift device of any one of the first aspect to the fifth aspect of the present disclosure, wherein the transmission is changed to a shift range corresponding to a first shift position when the detection unit detects that a selection value of the first shift position is larger than a selection value of a second shift position by a differential threshold or more.

In the shift device of the sixth aspect of the present disclosure, when the detection unit detects that a selection value of a first shift position is larger than a selection value of a second shift position by a differential threshold or more, the transmission is changed to a shift range corresponding to the first shift position. Therefore, the transmission can be appropriately changed to a shift range corresponding to the first shift position.

A shift device of a seventh aspect of the present disclosure is the shift device of any one of the first aspect to the sixth aspect of the present disclosure, wherein the shift range of the transmission is maintained when the detection unit detects the selection of the mid-position.

In the shift device of the seventh aspect of the present disclosure, when the detection unit detects the selection of the mid-position, the shift range of the transmission is maintained. Therefore, when the detection unit detects the selection of the mid-position, changing the shift range of the transmission can be restricted.

BRIEF DESCRIPTION OF DRAWINGS

Exemplary embodiments of the present disclosure will be described in detail based on the following figures, wherein.

DESCRIPTION OF EMBODIMENTS

First Exemplary Embodiment

Figure 1:
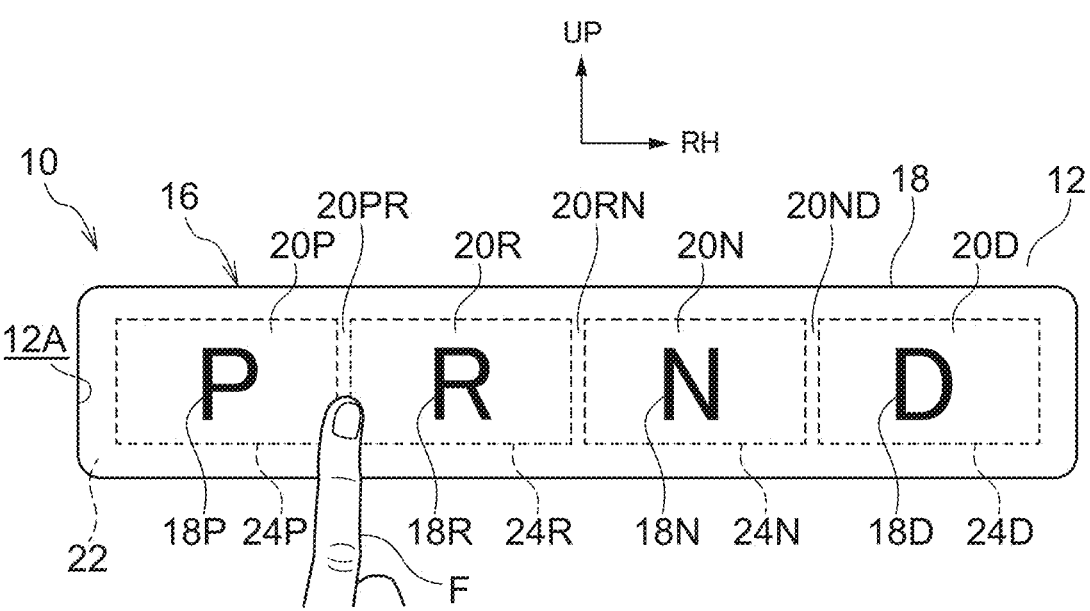
FIG. 1 is a front view illustrating a shift device according to a first exemplary embodiment of the present disclosure, as viewed from a face side.
Figure 2:
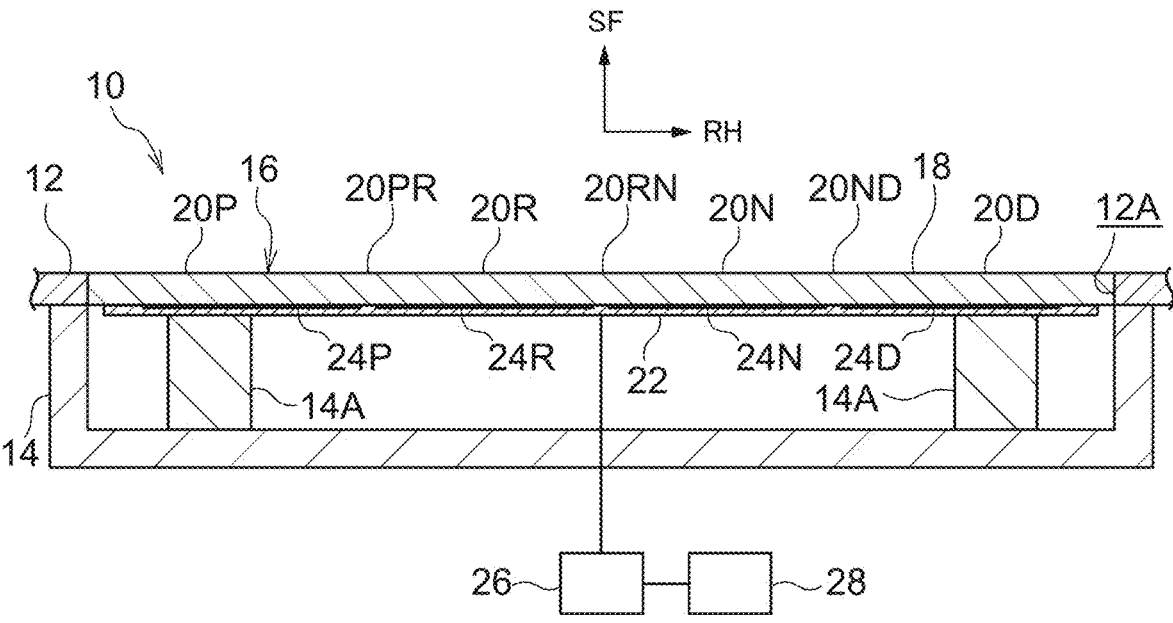
FIG. 2 is a sectional view illustrating the shift device according to the first exemplary embodiment of the present disclosure, as viewed from a lower side.

FIG. 1 is a front view illustrating a shift device 10 according to a first exemplary embodiment of the present disclosure as viewed from a face side and FIG. 2 is a sectional view illustrating the shift device 10 as viewed from a lower side. In the drawings, the face side of the shift device 10 is depicted with an arrow SF, a right side of the shift device 10 is depicted with an arrow RH, and an upper side of the shift device 10 is depicted with an arrow UP.

As illustrated in FIGS. 1 and 2, the shift device 10 according to the present exemplary embodiment is installed at a center portion in a vehicle width direction on an instrument panel 12 of a vehicle (automobile) and is disposed inside a steering wheel (not illustrated) of the vehicle in the vehicle width direction. The face side, right side, and upper side of the shift device 10 are directed to a back side, right side, and upper side of the vehicle, respectively.

The shift device 10 is provided with a case 14 with a substantially rectangular parallelepiped box shape as an installation body, the case 14 is fixed at the vehicle front side on the instrument panel 12. The case 14 is elongated in the right-and-left direction, the inside of the case 14 being opened to the face side. The instrument panel 12 has an opening 12A with a rectangular shape formed at the vehicle rear side on the case 14, the inside of the case 14 facing the opening 12A. In the case 14, a plurality of fixing columns 14A are provided, protruding from a backside wall of the case 14 to a face side.

On the face side of the case 14, a panel 16 with a rectangular plate shape as a selecting body is provided, the panel 16 being fixed on the face sides of the fixing columns 14A of the case 14 and fitting into the opening 12A of the instrument panel 12.

On the face side of the panel 16, a plate 18 with a rectangular plate shape as a selecting body is provided, the plate 18 being made of, for example, resin to be an insulator. The face-side surface on the plate 18 is disposed to be flush with the vehicle rear-side surface on the instrument panel 12, a face-side surface on the plate 18 together a vehicle rear-side surface on the instrument panel 12 forming a design surface in a cabin of the vehicle. Therefore, the face-side surface on the plate 18 is made capable of being touched by an occupant (in particular, a driver) of the vehicle with a finger F.

On the face-side surface on the plate 18, as the shift positions with rectangular shapes, a P position 20P (park position), an R position 20R (reverse position), an N position 20N (neutral position), and a D position 20D (drive position) are provided, and the P position 20P, the R position 20R, the N position 20N, and the D position 20D are arranged at equal intervals in this order from the left side to the right side. A "P" indicator 18P, an "R" indicator 18R, an "N" indicator 18N, and a "D" indicator 18D are indicated at central portions of the P position 20P, the R position 20R, the N position 20N, and the D position 20D, respectively.

On the face-side surface on the plate 18, a portion between the P position 20P and the R position 20R, a portion between the R position 20R and the N position 20N, and a portion between the N position 20N and the D position 20D are a PR position 20PR, an RN position 20RN, and an ND position 20ND as mid-positions, respectively, and the lateral dimensions of the PR position 20PR, the RN position 20RN, and the ND position 20ND are smaller than the lateral dimensions of the P position 20P, the R position 20R, the N position 20N, and the D position 20D.

On the backside of the plate 18, an electrostatic sheet 22 with a rectangular sheet shape is fixed as a detection unit, the electrostatic sheet 22 covering a backside surface on the plate 18. On a face side of the electrostatic sheet 22, a P electrode 24P, an R electrode 24R, an N electrode 24N, and a D electrode 24D with rectangular film shapes are provided as a shift detector, the P electrode 24P, the R electrode 24R, the N electrode 24N, and the D electrode 24D are arranged at equal intervals in this order from the left side to the right side. The lateral dimensions of the P electrode 24P, the R electrode 24R, the N electrode 24N, and the D electrode 24D are larger than the width dimension of the finger F of the occupant, and the lateral dimensions of a gap between the P electrode 24P and the R electrode 24R, a gap between the R electrode 24R and the N electrode 24N, and a gap between the N electrode 24N and the D electrode 24D are smaller than the width dimension of the finger F of the occupant. The entirety of each of the P electrode 24P, the R electrode 24R, the N electrode 24N, and the D electrode 24D is opposed to the entirety of each of the P position 20P, the R position 20R, the N position 20N, and the D position 20D in the front and back direction (thickness direction of the plate 18), and the P electrode 24P, the R electrode 24R, the N electrode 24N, and the D electrode 24D are made of, for example, metal, having conductivity.

The P electrode 24P, the R electrode 24R, the N electrode 24N, and the D electrode 24D of the electrostatic sheet 22 are electrically connected to a control device 26 of the vehicle, and a transmission 28 (automatic transmission) of the vehicle is electrically connected to the control device 26. The control device 26 is provided with a microcomputer in which a CPU, a ROM, a RAM, a non-volatile memory (storage), and the like are connected by a bus. In the control device 26, the CPU reads a program stored in the ROM and the storage and executes the program while developing the program in the RAM, thereby implementing various functions.

Next, the operation of the present exemplary embodiment will be described.

In the shift device 10 having the configuration described above, when the finger F of the occupant touches the P position 20P, the R position 20R, the N position 20N, or the D position 20D in the panel 16 (plate 18), capacitance is generated between the finger F and the P electrode 24P, the R electrode 24R, the N electrode 24N, or the D electrode 24D of the panel 16 (electrostatic sheet 22). Then, in a case where the capacitance (for example, a selection value detected as a voltage obtained by converting a current) between the finger F and the P electrode 24P, the R electrode 24R, the N electrode 24N, or the D electrode 24D is equal to or greater than a capacitance threshold for a time equal to or longer than a time threshold (for example, 0.5 seconds), the control device 26 determines that the P position 20P, the R position 20R, the N position 20N, or the D position 20D is selected (the selection of the P position 20P, the R position 20R, the N position 20N, or the D position 20D is detected), and the shift range of the transmission 28 is changed to the corresponding P range (park range), R range (reverse range), N range (neutral range), or D range (drive range) under the control by the control device 26.

Meanwhile, in the control device 26, priorities are set to the shift ranges of the transmission 28, and the order from the shift range with a higher priority to the shift range with a lower priority is set in the order of the P range, the N range, the D range, and the R range.

In a case where the finger F of the occupant touches the PR position 20PR in the panel 16 (refer to FIG. 1), and the capacitance between the finger F and each of the P electrode 24P and the R electrode 24R of the panel 16 is greater than or equal to the capacitance threshold for a time equal to or longer than the time threshold, the control device 26 determines that the PR position 20PR is selected (the selection of the PR position 20PR is detected), and the transmission 28 is changed to the P range with a higher priority to the R range under the control by the control device 26.

In a case where the finger F of the occupant touches the RN position 20RN in the panel 16, and the capacitance between the finger F and each of the R electrode 24R and the N electrode 24N is greater than or equal to the capacitance threshold for a time equal to or longer than the time threshold, the control device 26 determines that the RN position 20RN is selected (the selection of the RN position 20RN is detected), and the transmission 28 is changed to the N range with a higher priority to the R range under the control by the control device 26.

In a case where the finger F of the occupant touches the ND position 20ND in the panel 16, and the capacitance between the finger F and each of the N electrode 24N and the D electrode 24D is greater than or equal to the capacitance threshold for a time equal to or longer than the time threshold, the control device 26 determines that the ND position 20ND is selected (the selection of the ND position 20ND is detected), and the transmission 28 is changed to the N range with a higher priority to the D range under the control by the control device 26.

In a case where the fingers F of the occupant touch a plurality of shift positions among the P position 20P, the R position 20R, the N position 20N, and the D position 20D in the panel 16, and the capacitance between each of the fingers F and each of the P electrode 24P, the R electrode 24R, the N electrode 24N, and the D electrode 24D is greater than or equal to the capacitance threshold for a time equal to or longer than the time threshold, the control device 26 determines that the plurality of shift positions are selected (the selection of the plurality of shift positions is detected), and the transmission 28 is changed to the shift range with the highest priority among the shift ranges corresponding to the shift positions under the control by the control device 26.

Here, in the control device 26, the priorities on the shift ranges of the transmission 28 are set such that the priorities on the P range and the N range at which the vehicle is not driven are higher than those on the D range and the R range at which the vehicle is driven. When the PR position 20PR, the RN position 20RN, or the ND position 20ND is selected, the transmission 28 is changed to the P range, the N range, or the N range at which the vehicle is not driven. Therefore, when the PR position 20PR, the RN position 20RN, or the ND position 20ND is selected, the driving of the vehicle can be restricted, and the safety of the vehicle can be enhanced.

In the control device 26, the priorities on the shift ranges of the transmission 28 making a vehicle safety higher are set higher, and when the plurality of shift positions are selected, the transmission 28 is set to the shift range with the highest priority. Therefore, when the plurality of shift positions are selected, the safety of the vehicle can be enhanced.

In the present exemplary embodiment, the priorities on the shift ranges of the transmission 28 are set in the control device 26 in advance. However, the priorities on the shift ranges of the transmission 28 may be set by making a capacitance threshold for selecting a shift position corresponding to a shift range with a higher priority smaller than a capacitance threshold for selecting a shift position corresponding to a shift range with a lower priority. The priorities on the shift ranges of the transmission 28 may be set by making a time threshold (for example, 0.2 seconds) for selecting a shift position corresponding to a shift range with a higher priority smaller than a time threshold (for example, 0.5 seconds) for selecting a shift position corresponding to a shift range with a lower priority.

First Modification

In a modification (first modification) of the present exemplary embodiment, in a case where the finger F of the occupant touches the PR position 20PR in the panel 16, and the capacitance between the finger F and one of the P electrode 24P and the R electrode 24R is greater than or equal to the capacitance threshold and is greater than the capacitance between the finger F and the other of the P electrode 24P and the R electrode 24R by a differential threshold or more for a time equal to or longer than the time threshold, the control device 26 determines that the PR position 20PR is selected (the selection of the PR position 20PR is detected), and the transmission 28 is changed to one of the P range and the R range corresponding to the one of the P electrode 24P and the R electrode 24R under the control by the control device 26.

In a case where the finger F of the occupant touches the RN position 20RN in the panel 16, and the capacitance between the finger F and one of the R electrode 24R and the N electrode 24N is greater than or equal to the capacitance threshold and is greater than the capacitance between the finger F and the other of the R electrode 24R and the N electrode 24N by a differential threshold or more for a time equal to or longer than the time threshold, the control device 26 determines that the RN position 20RN is selected (the selection of the RN position 20RN is detected), and the transmission 28 is changed to one of the R range and the N range corresponding to the one of the R electrode 24R and the N electrode 24N under the control by the control device 26.

In a case where the finger F of the occupant touches the ND position 20ND in the panel 16, and the capacitance between the finger F and one of the N electrode 24N and the D electrode 24D is greater than or equal to the capacitance threshold and is greater than the capacitance between the finger F and the other of the N electrode 24N and the D electrode 24D by a differential threshold or more for a time equal to or longer than the time threshold, the control device 26 determines that the ND position 20ND is selected (the selection of the ND position 20ND is detected), and the transmission 28 is changed to one of the N range and the D range corresponding to the one of the N electrode 24N and the D electrode 24D under the control by the control device 26.

In a case where the plurality of fingers F of the occupant touch the plurality of mid-positions among the PR position 20PR, the RN position 20RN, and the ND position 20ND in the panel 16, and the largest capacitance between the finger F and one of the P electrode 24P, the R electrode 24R, the N electrode 24N, and the D electrode 24D is greater than or equal to the capacitance threshold and is greater than the second largest capacitance between the finger F and one of the P electrode 24P, the R electrode 24R, the N electrode 24N, and the D electrode 24D by a differential threshold or more for a time equal to or longer than the time threshold, the control device 26 determines that the plurality of mid-positions are selected (the selection of the plurality of mid-positions is detected), and the transmission 28 is changed to the shift range corresponding to the electrode with the largest capacitance under the control by the control device 26.

As described above, the transmission 28 can be changed appropriately to a shift range corresponding to an electrode with a large capacity.

Second Exemplary Embodiment

Figure 3A:
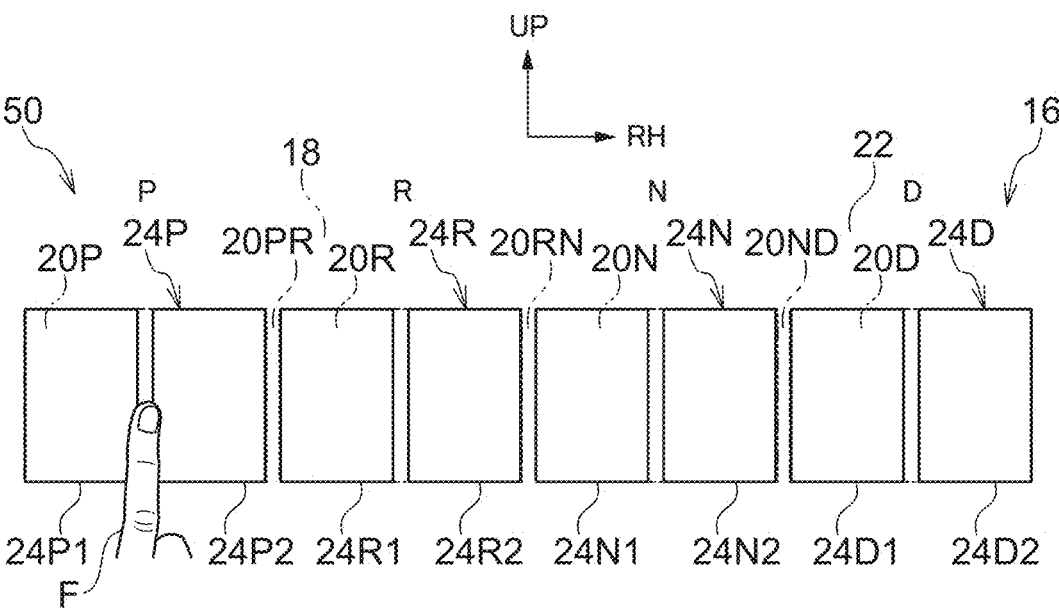
FIG. 3A is a front view illustrating a state of selection of a shift position in a shift device according to a second exemplary embodiment of the present disclosure, as viewed from the face side.

FIG. 3A illustrates a shift device 50 according to a second exemplary embodiment of the present disclosure in a front view as viewed from the face side.

The shift device 50 according to the present exemplary embodiment has substantially the same configuration as that of the first exemplary embodiment, but differs in the following points.

As illustrated in FIG. 3A, in the shift device 50 according to the present exemplary embodiment, the P electrode 24P of the electrostatic sheet 22 is divided into a first P electrode 24P1 on a left side and a second P electrode 24P2 on a right side, and the first P electrode 24P1 and the second P electrode 24P2 have the same rectangular film shape and a gap with a rectangular shape is formed between them. The R electrode 24R of the electrostatic sheet 22 is divided into a first R electrode 24R1 on a left side and a second R electrode 24R2 on a right side, and the first R electrode 24R1 and the second R electrode 24R2 have the same rectangular film shape and a gap with a rectangular shape is formed between them. The N electrode 24N of the electrostatic sheet 22 is divided into a first N electrode 24N1 on a left side and a second N electrode 24N2 on a right side, and the first N electrode 24N1 and the second N electrode 24N2 have the same rectangular film shape and a gap with a rectangular shape is formed between them. The D electrode 24D of the electrostatic sheet 22 is divided into a first D electrode 24D1 on a left side and a second D electrode 24D2 on a right side, and the first D electrode 24D1 and the second D electrode 24D2 have the same rectangular film shape and a gap with a rectangular shape is formed between them.

The lateral dimensions of the first P electrode 24P1, the second P electrode 24P2, the first R electrode 24R1, the second R electrode 24R2, the first N electrode 24N1, the second N electrode 24N2, the first D electrode 24D1, and the second D electrode 24D2 are larger than the width dimension of finger F of the occupant. The lateral dimensions of the gap between the first P electrode 24P1 and the second P electrode 24P2, the gap between the first R electrode 24R1 and the second R electrode 24R2, the gap between the first N electrode 24N1 and the second N electrode 24N2, the gap between the first D electrode 24D1 and the second D electrode 24D2 are smaller than the width dimension of finger F of the occupant.

Meanwhile, in a case where the finger F of the occupant touches the P position 20P in the panel 16 (refer to FIG. 3A), and the capacitance between the finger F and each of the first P electrode 24P1 and the second P electrode 24P2 of the P electrode 24P is greater than or equal to the capacitance threshold for a time equal to or longer than the time threshold, the control device 26 determines that the P position 20P is selected (the selection of the P position 20P is detected), and the transmission 28 is changed to the P range under the control by the control device 26.

In a case where the finger F of the occupant touches the R position 20R in the panel 16, and the capacitance between the finger F and each of the first R electrode 24R1 and the second R electrode 24R2 of the R electrode 24R is greater than or equal to the capacitance threshold for a time equal to or longer than the time threshold, the control device 26 determines that the R position 20R is selected (the selection of the R position 20R is detected), and the transmission 28 is changed to the R range under the control by the control device 26.

In a case where the finger F of the occupant touches the N position 20N in the panel 16, and the capacitance between the finger F and each of the first N electrode 24N1 and the second N electrode 24N2 of the N electrode 24N is greater than or equal to the capacitance threshold for a time equal to or longer than the time threshold, the control device 26 determines that the N position 20N is selected (the selection of the N position 20N is detected), and the transmission 28 is changed to the N range under the control by the control device 26.

In a case where the finger F of the occupant touches the D position 20D in the panel 16, and the capacitance between the finger F and each of the first D electrode 24D1 and the second D electrode 24D2 of the D electrode 24D is greater than or equal to the capacitance threshold for a time equal to or longer than the time threshold, the control device 26 determines that the D position 20D is selected (the selection of the D position 20D is detected), and the transmission 28 is changed to the D range under the control by the control device 26.

Figure 3B:
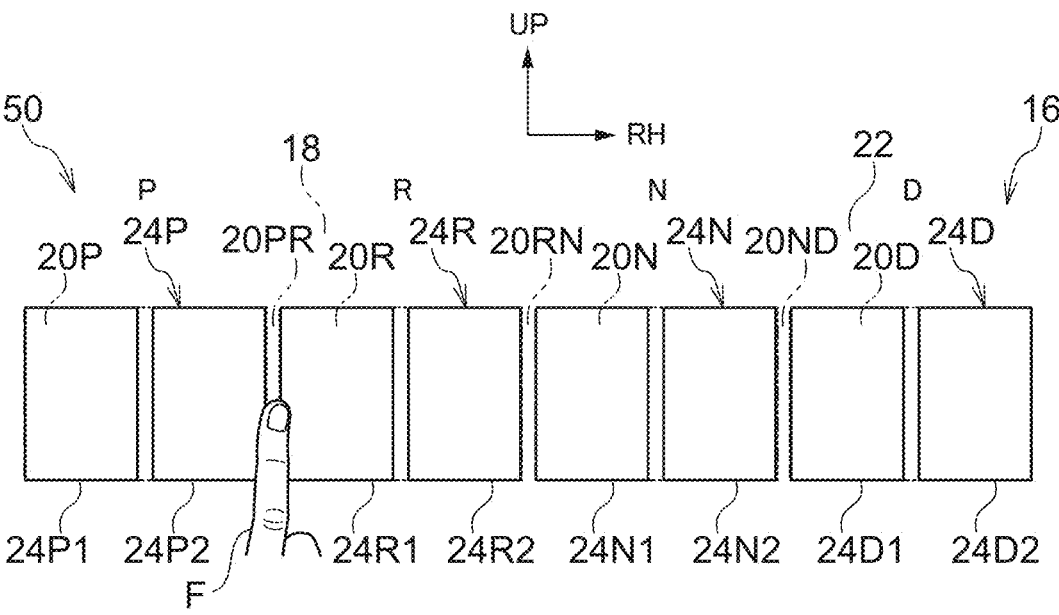
FIG. 3B is a front view illustrating a state of selection of a mid-position in the shift device according to the second exemplary embodiment of the present disclosure, as viewed from the face side.

In a case where the finger F of the occupant touches the PR position 20PR in the panel 16 (refer to FIG. 3B), and the capacitance between the finger F and each of the second P electrode 24P2 and the first R electrode 24R1 is greater than or equal to the capacitance threshold for a time equal to or longer than the time threshold, the control device 26 determines that the PR position 20PR is selected (the selection of the PR position 20PR is detected), and the transmission 28 is changed to the P range with a higher priority to the R range under the control by the control device 26.

In a case where the finger F of the occupant touches the RN position 20RN in the panel 16, and the capacitance between the finger F and each of the second R electrode 24R2 and the first N electrode 24N1 is greater than or equal to the capacitance threshold for a time equal to or longer than the time threshold, the control device 26 determines that the RN position 20RN is selected (the selection of the RN position 20RN is detected), and the transmission 28 is changed to the N range with a higher priority to the R range under the control by the control device 26.

In a case where the finger F of the occupant touches the ND position 20ND in the panel 16, and the capacitance between the finger F and each of the second N electrode 24N2 and the first D electrode 24D1 is greater than or equal to the capacitance threshold for a time equal to or longer than the time threshold, the control device 26 determines that the ND position 20ND is selected (the selection of the ND position 20ND is detected), and the transmission 28 is changed to the N range with a higher priority to the D range under the control by the control device 26.

Here, the present exemplary embodiment can exert the same operation and effect as that of the first exemplary embodiment.

Second Modification

In a modification (second modification) of the present exemplary embodiment, in a case where the finger F of the occupant touches the PR position 20PR in the panel 16, and the capacitance between the finger F and one of the second P electrode 24P2 and the first R electrode 24R1 is greater than or equal to the capacitance threshold and is greater than the capacitance between the finger F and the other of the second P electrode 24P2 and the first R electrode 24R1 by a differential threshold or more for a time equal to or longer than the time threshold, the control device 26 determines that the PR position 20PR is selected (the selection of the PR position 20PR is detected), and the transmission 28 is changed to one of the P range and the R range corresponding to the one of the second P electrode 24P2 and the first R electrode 24R1 under the control by the control device 26.

In a case where the finger F of the occupant touches the RN position 20RN in the panel 16, and the capacitance between the finger F and one of the second R electrode 24R2 and the first N electrode 24N1 is greater than or equal to the capacitance threshold and is greater than the capacitance between the finger F and the other of the second R electrode 24R2 and the first N electrode 24N1 by a differential threshold or more for a time equal to or longer than the time threshold, the control device 26 determines that the RN position 20RN is selected (the selection of the RN position 20RN is detected), and the transmission 28 is changed to one of the R range and the N range corresponding to the one of the second R electrode 24R2 and the first N electrode 24N1 under the control by the control device 26.

In a case where the finger F of the occupant touches the ND position 20ND in the panel 16, and the capacitance between the finger F and one of the second N electrode 24N2 and the first D electrode 24D1 is greater than or equal to the capacitance threshold and is greater than the capacitance between the finger F and the other of the second N electrode 24N2 and the first D electrode 24D1 by a differential threshold or more for a time equal to or longer than the time threshold, the control device 26 determines that the ND position 20ND is selected (the selection of the ND position 20ND is detected), and the transmission 28 is changed to one of the N range and the D range corresponding to the one of the second N electrode 24N2 and the first D electrode 24D1 under the control by the control device 26.

In a case where the plurality of fingers F of the occupant touch the plurality of mid-positions among the PR position 20PR, the RN position 20RN, and the ND position 20ND in the panel 16, and the largest capacitance between these fingers F and one of the second P electrode 24P2, the first R electrode 24R1, the second R electrode 24R2, the first N electrode 24N1, the second N electrode 24N2, and the first D electrode 24D1 is greater than or equal to the capacitance threshold and is greater than the second largest capacitance between these fingers F and one of the second P electrode 24P2, the first R electrode 24R1, the second R electrode 24R2, the first N electrode 24N1, the second N electrode 24N2, and the first D electrode 24D1 by a differential threshold or more for a time equal to or longer than the time threshold, the control device 26 determines that the plurality of mid-positions are selected (the selection of the plurality of mid-positions is detected), and the transmission 28 is changed to the shift range corresponding to the electrode with the largest capacitance under the control by the control device 26.

As described above, the transmission 28 can be changed appropriately to a shift range corresponding to an electrode with a large capacity.

Third Exemplary Embodiment

Figure 4:
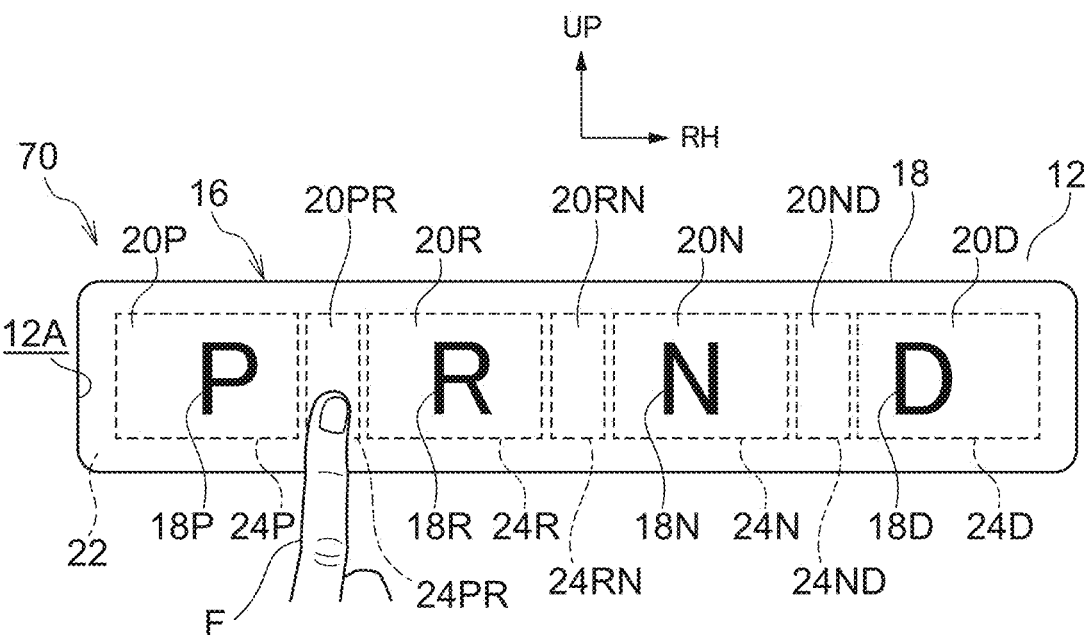
FIG. 4 is a front view illustrating a shift device according to a third exemplary embodiment of the present disclosure, as viewed from the face side.

FIG. 4 illustrates a shift device 70 according to a third exemplary embodiment of the present disclosure in a front view as viewed from the face side.

The shift device 70 according to the present exemplary embodiment has substantially the same configuration as that of the first exemplary embodiment, but differs in the following points.

As illustrated in FIG. 4, in the shift device 70 according to the present exemplary embodiment, the lateral dimensions of a gap between the P electrode 24P and the R electrode 24R, a gap between the R electrode 24R and the N electrode 24N, and a gap between the N electrode 24N and the D electrode 24D are made large in the electrostatic sheet 22. As the mid-position detector, a PR electrode 24PR, an RN electrode 24RN, and an ND electrode 24ND with a rectangular film shape are provided in the gap between the P electrode 24P and the R electrode 24R, the gap between the R electrode 24R and the N electrode 24N, and the gap between the N electrode 24N and the D electrode 24D, respectively. The lateral dimensions of the PR electrode 24PR, the RN electrode 24RN, and the ND electrode 24ND are larger than the width dimension of the finger F of the occupant, and the PR electrode 24PR, the RN electrode 24RN, and the ND electrode 24ND are made of, for example, metal, having conductivity, and are electrically connected to the control device 26.

Meanwhile, in a case where the finger F of the occupant touches the PR position 20PR in the panel 16 (refer to FIG. 4), and the capacitance between the finger F and the PR electrode 24PR is greater than or equal to the capacitance threshold for a time equal to or longer than the time threshold, the control device 26 determines that the PR position 20PR is selected (the selection of the PR position 20PR is detected), and the transmission 28 is changed to the P range with a higher priority to the R range under the control by the control device 26.

In a case where the finger F of the occupant touches the RN position 20RN in the panel 16, and the capacitance between the finger F and the RN electrode 24RN is greater than or equal to the capacitance threshold for a time equal to or longer than the time threshold, the control device 26 determines that the RN position 20RN is selected (the selection of the RN position 20RN is detected), and the transmission 28 is changed to the N range with a higher priority to the R range under the control by the control device 26.

In a case where the finger F of the occupant touches the ND position 20ND in the panel 16, and the capacitance between the finger F and the ND electrode 24ND is greater than or equal to the capacitance threshold for a time equal to or longer than the time threshold, the control device 26 determines that the ND position 20ND is selected (the selection of the ND position 20ND is detected), and the transmission 28 is changed to the N range with a higher priority to the D range under the control by the control device 26.

Here, the present exemplary embodiment can exert the same operation and effect as that of the first exemplary embodiment.

The selection of the PR position 20PR, the selection of the RN position 20RN, and the selection of the ND position 20ND are determined based on the capacitance between the finger F and the PR electrode 24PR, the capacitance between the finger F and the RN electrode 24RN, and the capacitance between the finger F and the ND electrode 24ND, respectively. Therefore, the capacitance for determining the selection of the PR position 20PR, the RN position 20RN, and the ND position 20ND can be increased, and the selection of the PR position 20PR, the RN position 20RN, and the ND position 20ND can be appropriately determined.

In the first exemplary embodiment (including the first modification), the second exemplary embodiment (including the second modification), and the third exemplary embodiment, in a case where the control device 26 determines that the PR position 20PR, the RN position 20RN, or the ND position 20ND is selected, the shift range of the transmission 28 is changed under the control by the control device 26. However, in a case where the control device 26 determines that the PR position 20PR, the RN position 20RN, or the ND position 20ND is selected, the shift range of the transmission 28 may be maintained without change under the control by the control device 26.

In the first exemplary embodiment (including the first modification), the second exemplary embodiment (including the second modification), and the third exemplary embodiment, in a case where the control device 26 determines that the plurality of shift positions are selected, the transmission 28 is changed to the shift range with the highest priority among the shift ranges corresponding to the shift positions under the control by the control device 26. However, in a case where the control device 26 determines that the plurality of shift positions are selected, the shift range of the transmission 28 may be maintained without being changed under the control by the control device 26.

In the first exemplary embodiment (including the first modification), the second exemplary embodiment (including the second modification), and the third exemplary embodiment, for example, the P position 20P in the panel 16 may also have a function for switching an electric parking brake. In this case, by electrically connecting the electric parking brake of the vehicle to the control device 26, the electric parking brake is operated when the transmission 28 is changed to the P range under the control by the control device 26, and the operation of the electric parking brake is released when the transmission 28 is changed from the P range under the control by the control device 26.

In the first exemplary embodiment (including the first modification), the second exemplary embodiment (including the second modification), and the third exemplary embodiment, the shift device 10, 50, or 70 is installed in the instrument panel. However, the shift device 10, 50, or 70 may be installed in other parts of the vehicle (such as a console or a column cover).

The disclosure of Japanese Patent Application No. 2022-079664 filed on May 13, 2022 is incorporated herein by reference in its entirety.

All documents, patent applications, and technical standards described in this specification are incorporated herein by reference as if each individual document, patent application, and technical standard were specifically and individually described to be incorporated by reference.

What is claimed is:

1. A shift device, comprising:
a plurality of shift positions configured to be selectable; and
a detection unit including a shift detector and a mid-position detector, wherein the shift detector is configured to detect a selection of one of plurality of shift positions at or above a predetermined threshold and to cause a shift range of a transmission of a vehicle to be changed, and the mid-position detector is configured to detect a selection of a mid-position between two adjacent positions of the plurality of shift positions at or above a predetermined threshold and to determine the shift range of the transmission of the vehicle.

2. A shift device, comprising:
a plurality of shift positions configured to be selectable; and
a detection unit configured to detect a selection of one of the plurality of shift positions and change a shift range of a transmission of a vehicle, and configured to detect a selection of a mid-position between two adjacent positions of the plurality of shift positions and determine the shift range of the transmission of the vehicle, wherein the transmission is shifted to the shift range having a higher predetermined priority between the shift ranges corresponding to the shift positions on respective sides of the mid-position when the detection unit detects the selection of the mid-position.

3. The shift device of claim 2, wherein a threshold for selecting the shift position corresponding to the shift range having the higher predetermined priority is smaller than a threshold for selecting the shift position corresponding to the shift range having a lower predetermined priority.

4. The shift device of claim 2, wherein the shift range comprises a park range, a reverse range, a neutral range, and a drive range, and the park range and the neutral range, in which the vehicle is not driven, is are assigned a higher priority than the reverse range and the drive range, in which the vehicle is driven.

5. A shift device, comprising:
a plurality of shift positions configured to be selectable; and
a detection unit configured to detect a selection of one of the plurality of shift positions and change a shift range of a transmission of a vehicle and configured to detect a selection of a mid-position between two adjacent positions of the plurality of shift positions and determine the shift range of the transmission of the vehicle, wherein the transmission is changed to the shift range corresponding to a first shift position of the plurality of shift positions when the detection unit detects that a selection value detected as a voltage corresponding to the first shift position is larger than a selection value detected as a voltage corresponding to a second shift position of the plurality of shift positions by a predetermined differential threshold or more.

6. The shift device of claim 1, wherein the shift range of the transmission is maintained when the detection unit detects the selection of the mid-position.

* * * * *